United States Patent [19]

Ono

[11] Patent Number: 5,446,554
[45] Date of Patent: Aug. 29, 1995

[54] READER FOR A FACSIMILE APPARATUS WHICH CARRIES OUT THE READ APPARATUS IN ACCORDANCE WITH A VACANT CAPACITY OF A BUFFER

[75] Inventor: Takashi Ono, Yokohama, Japan

[73] Assignee: Canon Kabushiki Kaisha, Tokyo, Japan

[21] Appl. No.: 174,452

[22] Filed: Dec. 28, 1993

[30] Foreign Application Priority Data

Jan. 7, 1993 [JP] Japan .................................. 5-001225

[51] Int. Cl.6 .......................... H04N 1/21; H04N 1/04; H04N 1/047
[52] U.S. Cl. .................................... 358/404; 358/474; 358/494
[58] Field of Search ................ 358/496, 498, 497, 494, 358/474, 486, 482, 483, 505, 513, 514, 471, 404, 444

[56] References Cited

U.S. PATENT DOCUMENTS 4,160,279 7/1979 Fuwa .
4,628,368 12/1986 Kurata et al. .
4,743,975 5/1988 Ijuin .
4,748,514 5/1988 Bell .
5,220,437 6/1993 Saegusa et al. ...................... 358/404

FOREIGN PATENT DOCUMENTS 0212487 3/1987 European Pat. Off. .
0371800 11/1989 European Pat. Off. .
3219764 9/1991 Japan .

*Primary Examiner*—Scott A. Rogers
*Attorney, Agent, or Firm*—Fitzpatrick, Cella, Harper & Scinto

[57] ABSTRACT

A reader for a facsimile apparatus comprises a line buffer capable of storing at least one line of read raw data and an image buffer for storing encoded image data, for reading an image in synchronism with a line sync signal. The image is continuously read at a period of the line sync signal until the image buffer becomes full, and after the image buffer has become full, the image is read at a period of at least two line sync signals, and when a vacent area of the image buffer subsequently exceeds a predetermined volume, the image is again read continuously at the period of the line sync signal.

21 Claims, 5 Drawing Sheets

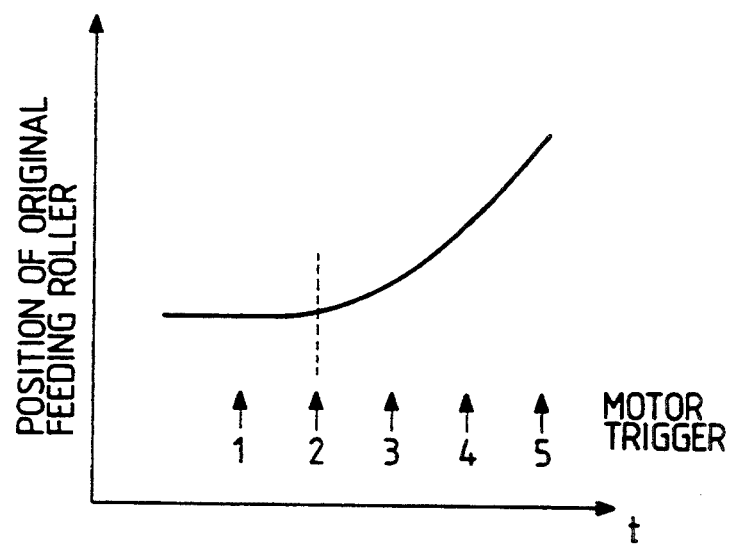
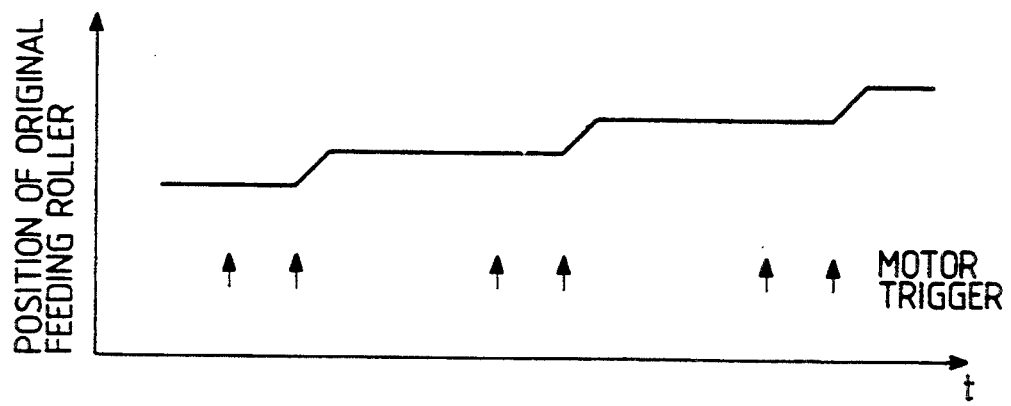

READER FOR A FACSIMILE APPARATUS WHICH CARRIES OUT THE READ APPARATUS IN ACCORDANCE WITH A VACANT CAPACITY OF A BUFFER

BACKGROUND OF THE INVENTION

1. Field of the Invention

The present invention relates to image read control of a facsimile apparatus.

2. Related Background Art

In a prior art facsimile apparatus, read image data is transmitted in the following manner. As shown in FIG. 2, a plurality of line buffers each capable of storing one line of raw data (non-coded data) are provided and data read by a CCD is binarized and transferred to the line buffers. When one line of data is stored in the line buffer, it is transferred to an encoder, encoded thereby and stored in an image buffer. The data stored in the image buffer is sequentially read and sent to a modem.

In the prior art read control, a line sync signal determined by a storage time of the CCD is used as a reference, and if the line buffer is vacant (or free) when the line sync signal is applied, an image is read and a document sheet is fed, and if the line buffer is full, the reading is not carried out but it waits until the line buffer becomes vacant.

Accordingly, the operation of the read system depends on the complexity of the document sheet image and a communication rate. For a simple image, a data compression rate is high and the image can be transmitted at a high rate and it is rare that the line buffer becomes full. Thus, the image can be continuously read at a substantially constant speed. For a complex image, the data compression rate is low and a transmission bit rate cannot follow a generation speed of one line of encoded data. Thus, the image buffer becomes full and the line buffer becomes full and the operation is intermittent. In a worst case, the intermittent operation is such that each time one line is read, the vacant state of the line buffer is waited before the next line is read.

FIG. 3 shows the movement of a document sheet feed roller when a drive trigger is outputted to a document sheet feed stepping motor. As stated above, the read operation depends on the document sheet. Even if the drive trigger is outputted to the document sheet feed stepping motor as shown in FIG. 3, there is a delay before the document sheet feed roller is actually moved. Further, since the read operation of the image and the output of the drive trigger are synchronized, if a plurality of lines are to be continuously read, the first line and the second line read substantially same area. FIG. 4 shows the movement of the document sheet feed roller in the intermittent reading by every other line. Since there is still a delay to the drive trigger before the feed roller is actually moved, the document sheet feed roller is rotated by two lines after it has read the substantially same area in the first line and the second line. Thus, when the intermittent reading by a small number of lines is effected, the linear image reading is not attained and the image disturbed.

SUMMARY OF THE INVENTION

It is an object of the present invention to improve a reader of a facsimile apparatus..

It is another object of the present invention to provide a reader of a facsimile apparatus which carries out the read operation in accordance with a vacant capacity of a buffer.

It is a still another object of the present invention to provide a reader of a facsimile apparatus which selects an intermittent operation or a continuous operation of relative movement between a document sheet and a line sensor depending on a vacant capacity of a line buffer.

BRIEF DESCRIPTION OF THE DRAWINGS

FIG. 3 shows the movement of a shaft of a document sheet feed roller when motor trigger is continuously applied, FIG. 4 shows the movement of the shaft of the document sheet feed roller in an intermittent operation with every other line.

DETAILED DESCRIPTION OF THE PREFERRED. EMBODIMENTS

Figure 1:
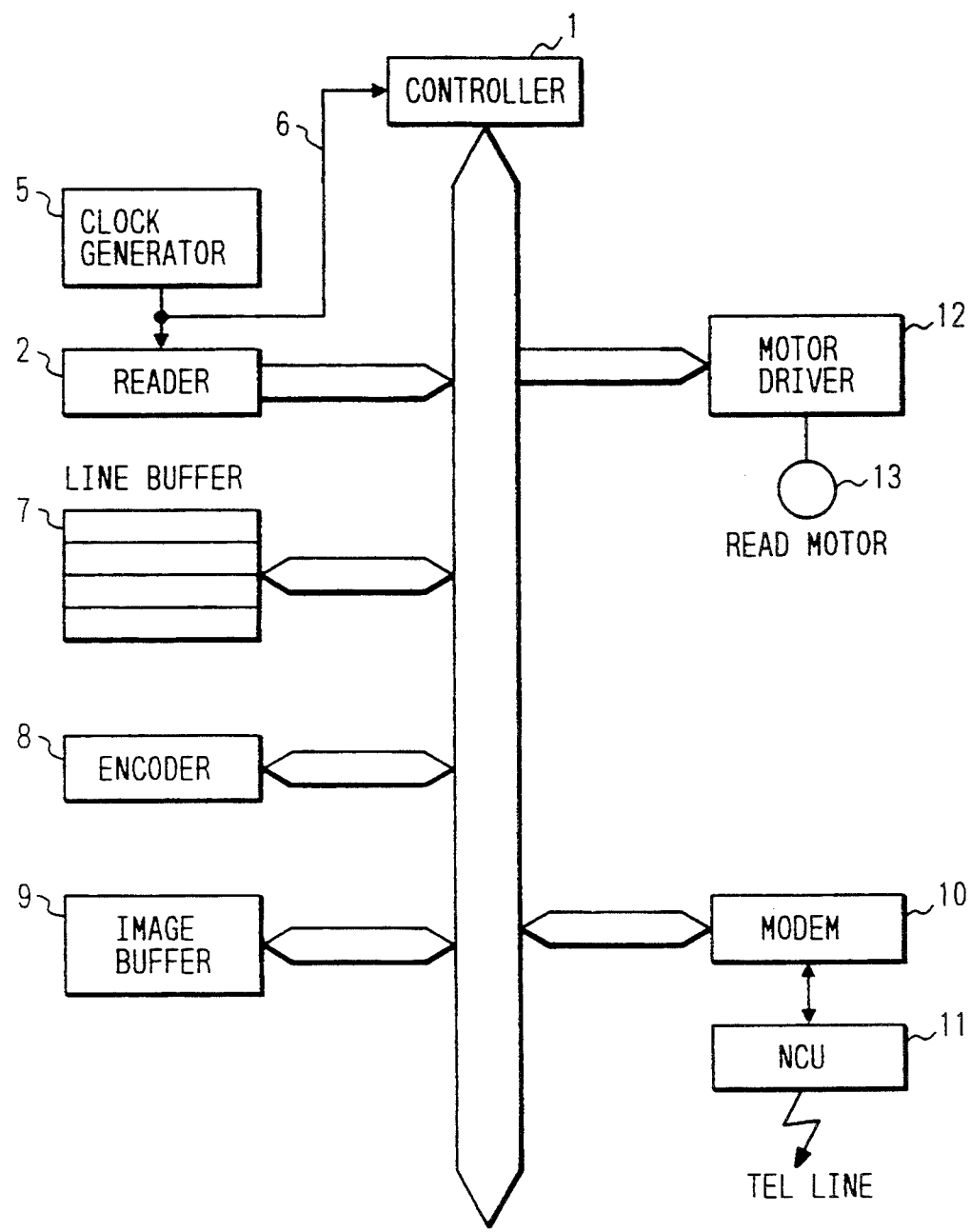
FIG. 1 shows a block diagram of an embodiment of the present invention.
Figure 2:
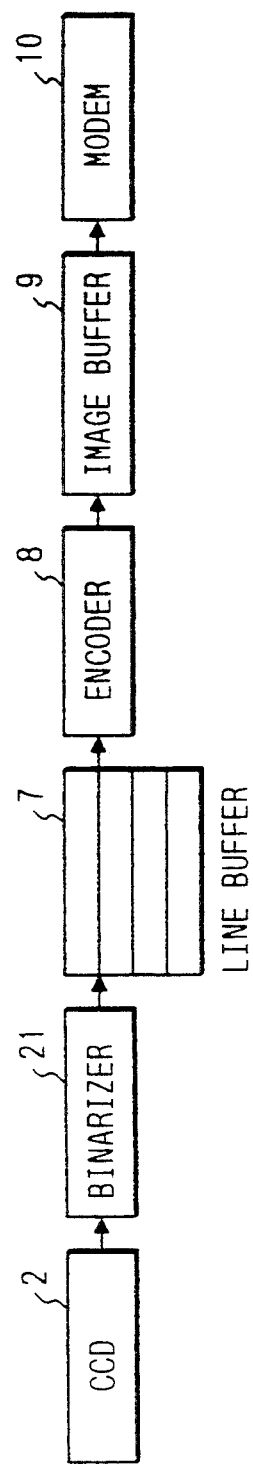
FIG. 2 shows a data flow chart of image data.

FIG. 1 shows a block diagram of an embodiment. Numeral 1 denotes a control unit, numeral 2 denotes an image read unit for reading a document sheet, photoelectrically converting it and converting it to black and white binary data, numeral 5 denotes a clock generator for generating a line sync singal determined by a storage time of a photo-electric conversion element included in the read unit 2, numeral 6 denotes a signal line for the line sync signal, numeral 7 denotes a line buffer capable of storing a plurality of lines of raw data (non-coded data), numeral 8 denotes an encoder for encoding the raw data stored in the line buffer 7, numeral 9 denotes an image buffer for storing the data encoded by the encoder 8, numeral 10 denotes a modem for transmitting the data stored in the image buffer 9, numeral 11 denotes an NCU, numeral 12 denotes a motor drive unit for driving a motor by a command from the control unit, and numeral 13 denotes a read motor for feeding a document sheet to be read.

A time required to encode one line is within an interval of the line sync signal.

The binary image data converted to the electrical signal by the image read unit 2 is stored in the line buffer 7, and when one line of image data is stored in the line buffer 7, the image data is transferred to the encoder 8 and encoded thereby and stored in the image buffer 9. The data stored in the image buffer 9 is sequentially read, modulated by the modem 10 and transmitted.

When the line sync signal is applied and the line buffer 7 is vacant, the control unit 1 transfers the image data to the line buffer 7 and commands to the motor drive unit 12 to advance the read motor 13 by one line. Namely, until the image buffer 9 becomes full, the continuous read operation is carried out in synchronism with the line sync signal. When the image buffer 9 becomes full and the line buffer 7 also becomes full, the read operation is not carried out even if the line sync signal is applied but it waits until the line buffer 7 becomes vacant. Even if the line buffer 7 subsequently becomes vacant, the continuous reading is not effected but the next line is read with the interval of at least one line sync signal. Thus, after the image buffer 9 has become full, the intermittent reading with every other line is carried out. When the data rate transmitted by the modem 10 becomes faster than the generation rate of the encoded data so that the vacant area of the image buffer increases above a predetermined volume, the continuous image reading is carried out until the image buffer 9 again becomes full.

By this control, the read operation can be limited to the continuous reading and the intermittent reading with every other line and the linear image reading is attained without affecting to the communication time.

Figure 5:
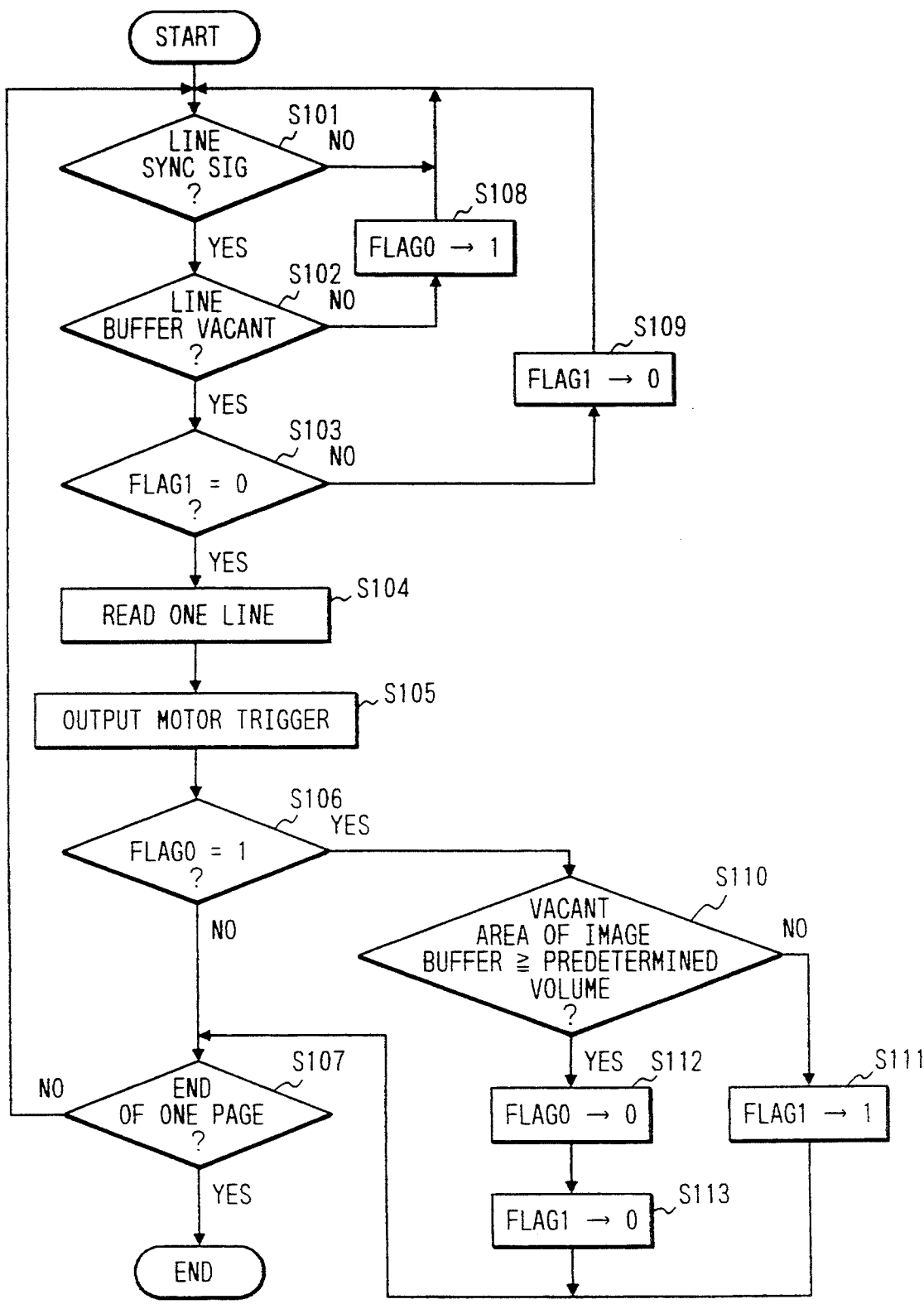
FIG. 5 shows a flow chart of control in the embodiment.

FIG. 5 shows a flow chart of the read control. When the image reading is started, the control unit 1 waits for the input of the line sync signal in a step S101. When the line sync signal is applied, the process proceeds to step S102 to determine if there is a vacant area in the line buffer 7 or not. If there is, the process proceeds to a step S103 to determine whether a flag FLAG1 which indicates whether to read or not is "0" or not. If it is "0", the process proceeds to a step S104 to read one line, and a command is issued to the motor drive unit 12 to advance the motor 13 by one line in a step S105. In a step S106, whether a flag FLAG0 which indicates whether the image buffer 9 is full or not is "1" or not, and if it is not "1", the process proceeds to a step S107 to determine if one page of reading has been completed or not. If it has not, the process returns to the step S101 to read the next line. If the line buffer 7 is not vacant in the step S102, the process proceeds to a step S108 to set the FLAG0 to "1" assuming that the image buffer 9 has become full. This is due to the fact that the time required to encode one line is shorter than the line sync signal interval. The process then returns to the step S101 to wait for the vacant state of the line buffer 7. When the line buffer 7 becomes vacant, the process proceeds to a step S103. In the step S103, if the FLAG1 is "1", the reading is not effected and the process proceeds to a step S109 to reset the FLAG1 and returns to the step S101. If the FLAG0 is "1" in the step S106, the process proceeds to a step S110 to determine if the vacant area of the image buffer 9 is above the predetermined volume or not, and if it is not, the process proceeds to a step S111 to set the FLAG1 to "1" to continue the intermittent reading and then proceeds to the step S107. If the vacant area of the buffer 9 is above the predetermined volume in the step S110, the FLAG0 and the FLAG1 are reset in steps S112 and S113 to stop the intermittent reading.

By this control, the continuous reading is effected until the image buffer 9 becomes full, and after the image buffer 9 has become full, the intermittent reading with every other line is effected until the vacant area of the image buffer 9 reaches the predetermined volume. When the vacant area of the image buffer 9 exceeds the predetermined volume, the continuous reading is reinitiated so that the linear image reading is attained without affecting to the communication time.

Other Embodiments

In the above embodiment, the interval of the intermittent reading is one line sync signal interval. Alternatively, the reading interval may be a plurality of line sync signal intervals such as three or four depending on a damping characteristic of the motor.

Figure 6:
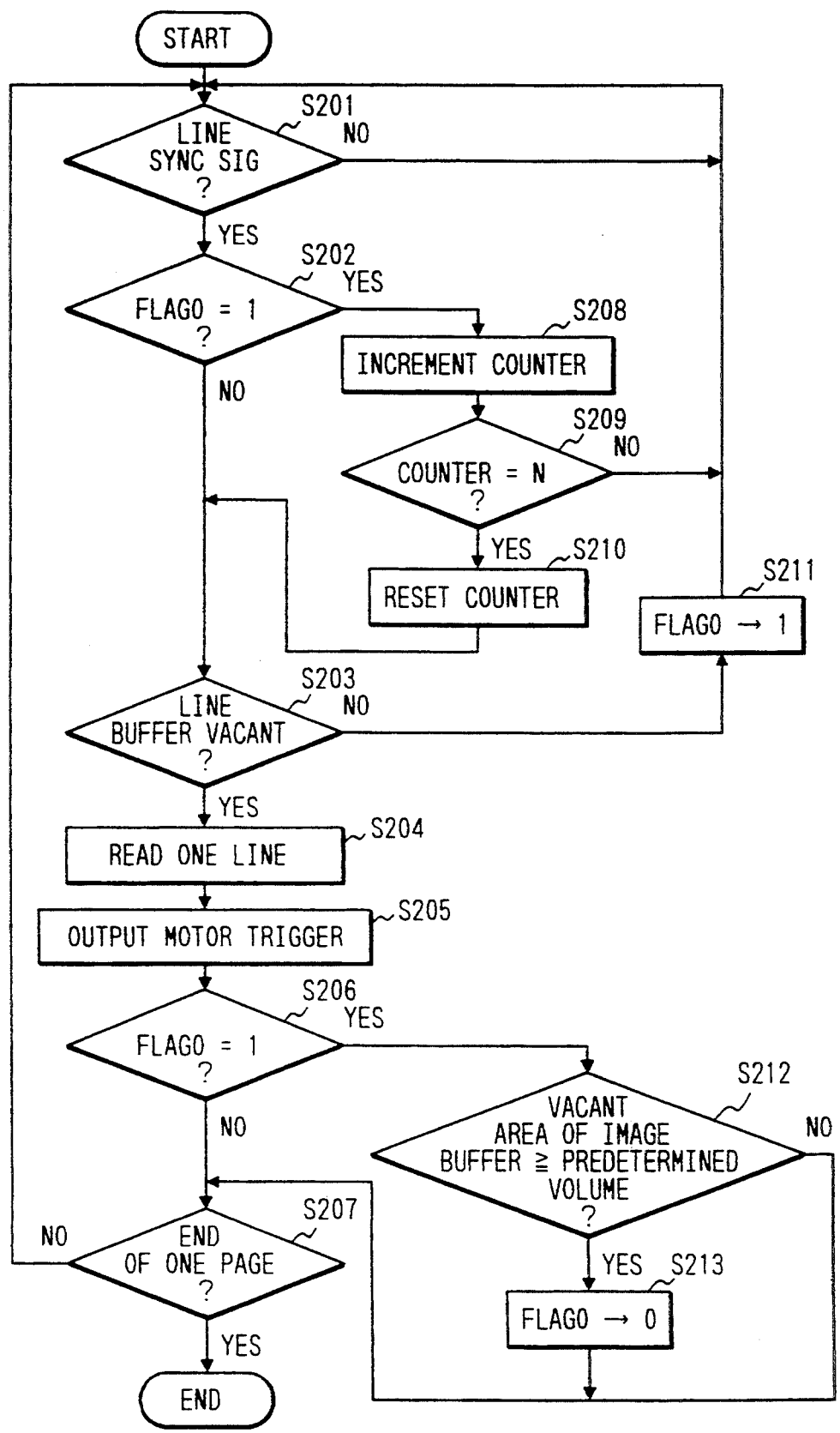
FIG. 6 shows a flow chart of control in other embodiment of the present invention.

FIG. 6 shows a flow chart when the interval is N (N=1, 2, 3, ...) line sync signal interval s, and the control therefor is explained below.

FIG. 6 shows a flow chart of the read control when the one line read interval is extended for the intermittent reading with every other line. The control unit 1 waits for the input of the line sync signal in a step S201. When the line sync signal is applied, the process proceeds to a step S202 to determine if the FLAG0 which indicates whether the image buffer 9 has become full is "1" or not. If it is not "1", the process proceeds to a step S203 to determine if the line buffer 7 is vacant or not. If it is vacant, the process proceeds to a step S204 to conduct the one line read, and in a step S205, a command is issued to the motor drive unit 12 to advance the motor 13 by one line. In a step S206, whether the FLAG0 is "1" or not is determined, and if it is not "1", the process proceeds to a step S207 to determine if it is the end of one page or not. If it is not the end, the process returns to the step S201 to read the next line.

If the FLAG0 is "1" in the step S202, the process proceeds to a step S208 to increment the counter. The process then proceeds to a step S209 to compare the count of the counter with a predetermined count N. If it is not equal, the reading is not effected and the process returns to the step S201. If it is equal to N, the counter is reset in a step S210 and the process proceeds to the step S203. If the line buffer 7 is not vacant in the step S203, the process proceeds to a step S211 assuming that the image buffer 9 is full to set the FLAG0 to "1". Then, the process returns to the step S201.

If the FLAG0 is "1" in the step S206, the process proceeds to a step S212 to determine if the vacant area of the image buffer 9 is above the predetermined volume or not. If it is not, the process proceeds to the step S207. If it is above the predetermined volume, the process proceeds to a step S213 to reset the FLAG0 to stop the intermittent reading, and the process proceeds to the step S207.

By this control, the interval of the line reading in the intermittent reading is at least N line sync signal intervals so that the control may fit to the damping characteristic of the motor.

In accordance with the present invention, the read operation is limited to the continuous operation and the intermittent operation with every other line so that the intermittent operation with a small number of lines (2 to 4 lines) is eliminated and the linear image reading is attained. When the vacant area of the image buffer exceeds the predetermined volume during the intermittent reading with every other line, the continuous reading is reinitiated. Accordingly, the linear image reading is attained without affecting to the communication time.

What is claimed is:

1. A reading method for a reading apparatus having an image buffer for storing image data, wherein the reading apparatus reads an image in synchronism with a line sync signal, said method comprising the steps of:
   continuously reading the image at a period of the line sync signal, until the image buffer becomes full;
   intermittently reading, after the image buffer has become full, the image at a period of at least two line sync signals; and
   again continuously reading the image, when a vacant area of the image buffer subsequently exceeds a predetermined volume, at the period of the line sync signal.

2. An image reading apparatus, comprising:
   reading means for reading an original image;
   moving means for carrying out relative movement between an original and said reading means;
   storing means for storing image data read by said reading means;

detecting means for detecting a vacant capacity of said storing means; and change-over means for changing over between a first speed indicating a relative moving speed of said moving means and a second speed, lower than the first speed, in accordance with the vacant capacity detected by said detecting means, wherein said change-over means uses a predetermined first vacant capacity as a reference for changing over from the first speed to the second speed, and uses a second predetermined vacant capacity, different from the first predetermined vacant capacity, as a reference for changing over from the second speed to the first speed.

3. An apparatus according to claim 2, wherein the first speed is so determined that the relative movement is consecutively carried out without suspension.

4. An apparatus according to claim 2, wherein the second speed is so determined that the relative movement is suspended and carried out by one line in a predetermined repeat cycle.

5. An apparatus according to claim 2, wherein the second predetermined vacant capacity is larger than the first predetermined vacant capacity.

6. An apparatus according to claim 2, wherein the first predetermined vacant capacity indicates no vacant capacity.

7. An apparatus according to claim 2, further comprising output means for outputting the image data stored in said storing means.

8. An apparatus according to claim 7, wherein said output means outputs the image data stored in said storing means onto a communication line.

9. An apparatus according to claim 2, wherein said storing means includes a line buffer for storing non-encoded image data output from said reading means, and an image buffer for storing encoded image data.

10. An image reading apparatus, comprising:
reading means for reading on original image;
a line buffer for storing image data read by said reading means;
encoding means for encoding the image data stored in said line buffer;
an image buffer for storing image data encoded by said encoding means;
output means for outputting the encoded image data stored in said image buffer;
first detection means for detecting whether or not said line buffer is full;
second detection means for detecting whether or not a vacant capacity of said image buffer is equal to or larger than a predetermined volume; and
means for intermittently providing the image data output from said reading means into said line buffer after said first detection means detects said line buffer is full, and thereafter, for continuously providing the image data output from said reading means into said line buffer after said second detection means detects a vacant capacity of said image buffer is equal to or larger than the predetermined volume.

11. An apparatus according to claim 10, wherein said output means outputs the image data stored in said image buffer onto a communication line.

12. A method on an image reading apparatus, said method comprising the steps of:
reading, using reading means, an original image;
carrying out relative movement between an original and the reading means;
storing image data, read at said reading step, in storing means;
detecting a vacant capacity of the storing means; and
changing over between a first speed, indicating a relative moving speed of said carrying out step, and a second speed lower than the first speed, in accordance with the vacant capacity detected at said detecting step,
wherein, at said changing over step, a first predetermined vacant capacity is used as a reference for changing over from the first speed to the second speed, and a second predetermined vacant capacity, different from the first predetermined vacant capacity, is used as a reference for changing over from the second speed to the first speed.

13. A method according to claim 12, wherein the first speed is so determined that the relative movement is consecutively carried out without suspension.

14. A method according to claim 12, wherein the second speed is so determined that the relative movement is suspended and carried out by one line in a predetermined repeat cycle.

15. A method according to claim 12, wherein the second predetermined vacant capacity is larger than the first predetermined vacant capacity.

16. A method according to claim 12, wherein the first predetermined vacant capacity indicates no vacant capacity.

17. A method according to claim 12, further comprising an output step of outputting the image data stored in the storing means.

18. A method according to claim 17, wherein, at said output step, the image data stored in the storing means is output onto a communication line.

19. A method according to claim 12, wherein the storing means includes a line buffer for storing non-encoded image data output at said reading step, and an image buffer for storing encoded image data.

20. A method on an image reading apparatus, said method comprising:
a reading step of reading an original image;
a storing step of storing image data, read at said reading step, in a line buffer;
an encoding step of encoding the image data stored in the line buffer;
a storing step of storing image data, encoded at said encoding step, in an image buffer;
an outputting step of outputting the encoded image data stored in the image buffer;
a first detecting step of detecting whether the line buffer is full or not;
a second detecting step of detecting whether or not a vacant capacity of the image buffer is equal to or larger than a predetermined volume; and
a step of intermittently providing the image data read at said reading step into the line buffer after said first detecting step detects the line buffer is full, and thereafter, continuously providing the image data read at said reading step into the line buffer after said second detecting step detects a vacant capacity of the image buffer is equal to or larger than the predetermined volume.

21. An apparatus according to claim 20, wherein said outputting step outputs the image data stored in the image buffer onto a communication line.

* * * * *

UNITED STATES PATENT AND TRADEMARK OFFICE
CERTIFICATE OF CORRECTION

PATENT NO. : 5,446,554
DATED : August 29, 1995
INVENTOR(S) : TAKASHI ONO

It is certified that error appears in the above-identified patent and that said Letters Patent is hereby corrected as shown below:

ON TITLE PAGE

In [56] References Cited, under FOREIGN PATENT DOCUMENTS:

"0371800   11/1989   Eur. Pat. Off." should read
--0371800   6/1990   Eur. Pat. Off.-- and
"3219764   9/1991   Japan" should read
--3-219764   9/1991   Japan--.

In [57] ABSTRACT, Line 10: "vacent" should read --vacant--.

COLUMN 3

Line 10, "to" should be deleted.
Line 65, "interval s," should read --intervals,--.

COLUMN 4

Line 5, "not" should read --not.--.

UNITED STATES PATENT AND TRADEMARK OFFICE
CERTIFICATE OF CORRECTION

PATENT NO. : 5,446,554
DATED : August 29, 1995
INVENTOR(S) : TAKASHI ONO

It is certified that error appears in the above-identified patent and that said Letters Patent is hereby corrected as shown below:

COLUMN 5

Line 39, "on" should read --an--.
    Line 65, "line," should read --line.--.

Signed and Sealed this

Ninth Day of January, 1996

Attest:

BRUCE LEHMAN

*Attesting Officer*     *Commissioner of Patents and Trademarks*